United States Patent [19]

Linde et al.

[11] 4,378,977

[45] * Apr. 5, 1983

[54] REMOVAL OF UNDESIRED GASEOUS COMPONENTS FROM HOT WASTE GASES

[75] Inventors: Gerhard Linde, Gruenwald; Peter Haeussinger, Munich; Claus Schliebener, Strasslach, all of Fed. Rep. of Germany

[73] Assignee: Linde Aktiengesellschaft, Wiesbaden, Fed. Rep. of Germany

[ * ] Notice: The portion of the term of this patent subsequent to Oct. 13, 1998, has been disclaimed.

[21] Appl. No.: 309,641

[22] Filed: Oct. 7, 1981

Related U.S. Application Data

[63] Continuation-in-part of Ser. No. 93,089, Nov. 9, 1979, Pat. No. 4,294,590.

[30] Foreign Application Priority Data

Nov. 11, 1978 [DE] Fed. Rep. of Germany ....... 2848721
Oct. 25, 1979 [DE] Fed. Rep. of Germany ....... 2943130

[51] Int. Cl.$^3$ .............................................. B01D 53/14
[52] U.S. Cl. ........................................... 55/48; 55/49; 55/53; 55/55; 55/73; 62/17
[58] Field of Search .................. 55/31, 32, 33, 35, 48, 55/49, 53, 55, 73, 74, 89; 62/17, 19

[56] References Cited

U.S. PATENT DOCUMENTS

| | | | |
|---|---|---|---|
| 2,251,216 | 7/1941 | Woodhouse | 55/73 |
| 2,880,591 | 4/1959 | Kwauk | 55/48 X |
| 2,921,648 | 1/1960 | Wetterholm et al. | 55/48 |
| 3,023,836 | 3/1962 | Kasbohm et al. | 55/62 X |
| 3,498,067 | 3/1970 | Ranke | 62/17 |
| 3,664,091 | 5/1972 | Hegwer | 55/48 X |
| 3,910,777 | 10/1975 | Jakob | 55/48 |
| 4,020,149 | 4/1977 | Bosniack | 55/73 X |
| 4,066,423 | 1/1978 | McGill et al. | 55/48 |
| 4,177,250 | 12/1979 | Irvin et al. | 55/73 X |
| 4,294,590 | 10/1981 | Linde et al. | 55/48 |

FOREIGN PATENT DOCUMENTS

| | | | |
|---|---|---|---|
| 965919 | 7/1957 | Fed. Rep. of Germany . | |
| 722354 | 3/1932 | France . | |
| 523328 | 4/1955 | Italy | 55/49 |

*Primary Examiner*—Robert H. Spitzer
*Attorney, Agent, or Firm*—Millen & White

[57] ABSTRACT

For removing undesired gaseous components, e.g., $SO_2$, from hot combustion gases (from carbonaceous fuels) by scrubbing with a regenerable absorbent, the scrubbing is conducted with a liquid physical absorbent, e.g., dimethylformamide, at a temperature less than 0° C. The cooling requirements of the scrubbing process are supplied by means of an absorption-type refrigeration unit. The hot combustion gases, prior to scrubbing, are cooled in indirect heat exchange, first with air in an upper temperature range cooling zone, and then with cold combustion gas purified by the scrubbing in a lower temperature range cooling zone. The resultant heated air is used in part as (a) air for combustion, and/or in part as (b) an energy source for the operation of the absorption-type refrigeration unit. A heat pump may be used to supplement the said refrigeration unit. Additionally, the resultant heated air can also be used in part as (c) an admixture to the scrubbed combustion gas mixed, and/or in part as (d) a purging gas for regenerating dessicators arranged in the undesired gaseous components (e.g. $SO_2$) stream from a regenerator wherein the liquid physical absorbent is regenerated to be recycled to the scrubbing stage.

35 Claims, 2 Drawing Figures

REMOVAL OF UNDESIRED GASEOUS COMPONENTS FROM HOT WASTE GASES

This application is a continuation-in-part application of application Ser. No. 093,089, filed Nov. 9, 1979, now U.S. Pat. No. 4,294,590. All subject matter described in parent application Ser. No. 093,089 is incorporated by reference herein.

BACKGROUND OF THE INVENTION

This invention relates to a process for removing undesired gaseous components from hot combustion gases by scrubbing with a regenerable absorption agent.

The problem of removing undesired gaseous components from combustion gases is becoming ever more pressing. The sulfurous components occurring in the combustion gases when burning fossil fuel in coal or oil based power plants in particular are damaging to the environment and therefore, must be removed from the combustion gases before such are released into the atmosphere.

The removal of sulfur dioxide from such combustion gases thus far has been conducted mostly chemically, i.e., by scrubbing with absorption means in which the effective ingredients are alkali or alkali-earth compounds. As a rule, alkaline earth oxides or carbonates, such as magnesium oxide or calcium carbonate, or also alkali metal carbonates, alkali metal hydrogen carbonates, alkali metal sulfites, alkali metal hydrogen sulfites or alkali metal thiosulfates, for instance of sodium, have been used. The resulting reaction products are the corresponding sulfurous salts, namely sulfites, hydrogen sulfites or sulfates. These chemical absorption processes have been conducted primarily at relatively high temperatures only slightly, if at all, below the temperatures at which the combustion gases themselves were obtained. The equipment for implementing these purification processes is therefore subjected to a substantial and constant thermal load and must be made of the appropriate heat-resistant materials. Additionally, the waste gases finally expelled into the atmosphere at relatively high temperatures often still contain steam, even when part of their thermal energy had been previously tapped, for instance for the production of superheated steam or for preheating the combustion air.

As an incidental note, it is seen that Patent No. 965,919 of the Federal Republic of Germany discloses treating the gas to be purified by low tmperature scrubbing, for instance with methanol at $-80°$ C., especially to remove sulfur dioxide from gases; however, this patent is irrelevant to the present invention insofar as the patent does not pertain to the treatment of hot combustion gases. Instead, the gases to be purified in this patent are initially at ambient temperature. For cooling purposes, there is provided a special ethylene coolant circulating system.

SUMMARY OF THE INVENTION

An object of this invention is to provide an improved absorption process using a regenerable absorption agent for the removal of undesired gaseous components from hot combustion gases.

Another object is to provide, in a preferred embodiment of the invention, a particular improved design and/or arrangement of regenerators.

Upon further study of the specification and appended claims, further object and advantages of this invention will become apparent to those skilled in the art.

These objects are accomplished by a process for removing undesired gaseous components from hot combustion gases by scrubbing with a regenerable absorbent, the improvement which comprises conducting the scrubbing with a liquid physical absorbent at a temperature less than 0° C. and supplying the cooling requirements of the scrubbing process by means of an absorption-type refrigeration unit cooling the combustion gases prior to scrubbing, in indirect heat exchange with gas streams to be heated, the indirect heat exchange being performed in an upper temperature range and a subsequent lower temperature range and using air as said gas stream to be heated in the upper temperature range of the indirect heat exchange, resultant heated air being used in part as (a) preheated air of combustion, in part as (b) an energy source for the operation of the absorption-type refrigeration unit, in part as (c) an admixture with the scrubbed combustion gas before exhausting and/or in part as (d) a purging gas for regenerating dessicators arranged in the undesired gaseous components (e.g. $SO_2$) stream removed from a regenerator wherein the liquid physical absorbent is regenerated to be recycled to the scrubbing stage.

The invention comprises the use of low temperature scrubbing for the purification of hot combustion gases and the thermal integration of the various process stages by the utilization of the high temperature heat contained in the hot waste gases as an energy source for the cooling system used to cool a physical regenerable liquid absorption agent for the low temperature scrubbing. As known, the advantageous effects of low temperature scrubbing conducted with a physical scrubbing agent include the advantage that the required amount of scrubbing agent generally decreases with decreasing temperature, resulting in the use of only a minimal amount of washing agent, as well as a minimal operational cost for regenerating the scrubbing agent and for covering the cooling losses. The high temperature heat of the hot combustion gases is appropriately used within the overall process, on one hand to heat the air taken in from the atmosphere and required for the combustion process, and/or on the other hand to help run the absorption-type refrigeration unit to meet the cooling losses.

Another use for the high temperature heat is either alternatively or inclusively mixing at least part of the heated air with the scrubbed combustion gas before said combustion gas is exhausted. This use increases the temperature of the purified combustion gas to increase the draft in the exhaust, i.e., the exhaust stack or chimney. Furthermore, the dew-point of water in the scrubbed combustion gas is lowered, thus the danger of falling below the dew-point is reduced and results in less corrosion because the possibility of corrosive substances forming from trace amounts of undesired gaseous components remaining is substantially reduced. A final alternative use for the heated air is as a purging gas for regenerating dessicators arranged in the undesired gas, e.g., $SO_2$ stream from a regenerator in which the liquid physical absorbent is regenerated. The dessicators are arranged in the outlet undesired gas, e.g., $SO_2$ stream to dry the undesired gas, e.g., $SO_2$ stream, for the purpose of avoiding corrosive compounds being formed. Thus, the heated air serves to purge the dessicators as needed.

The overall temperature range of the heat exchange—which is characterized by a temperature gradient of the fluid flows participating in said exchange—is considered as an upper and a lower temperature range which are directly connected. When being cooled, the temperature of hot waste gases traverses the entire range, while the gas streams to be heated in each case will traverse only either the upper or the lower temperature range. Because of the heating of two air flows—generally carried out in common—in the upper temperature range, there is simultaneously also solved the problem of balancing the heat economy in the corresponding heat exchangers. Heating the incoming combustion air alone, in the sense of conventional procedures, would not suffice for such a balance, as the combustion waste gases due to the presence of relatively large amounts of carbon dioxide and also steam have a higher specific heat than the combustion air. The more unbalanced the thermal conditions during the heat exchange, the poorer ultimately must be the utilization of the thermal energy. This problem is advantageously solved by the step of the invention wherein at least a part of the heated air is used as an energy source for the absorption-type refrigeration unit.

A further development of the invention provides alternatively, or in combination, using the scrubbed waste gas in the lower temperature range of the heat exchange as the flow heat exchange gas. The boundary temperature between the lower and upper temperature ranges can be appropriately selected so that the scrubbed waste gas which will be expelled after passing through the heat exchange in the lower temperature range is at such a temperature that it will only insignificantly exceed that of the ambient. This boundary temperature will then exceed that of the air taken in from the ambient and which possibly is compressed, as this air must be immediately heated when entering the upper temperature range.

Still a further development is that if the additional flow of air following its use as a heating gas should still be at a temperature which is essentially above that of the purified, heated waste gas, then it may be admixed to latter. Because of the relative proportions of gases, there results on one hand a mixture temperature which is relatively close to that of the heated waste gas, said mixture temperature on the other hand sufficing to evacuate the purified waste gas mixed with air by means of a natural draft created through a flue or exhaust stack, and without additional blower means. Additionally, the dew point of the water in the exiting waste gas is lowered and thus the danger of falling below the dew point and corrosive substances forming is substantially reduced. Generally, the boundary temperature between the upper and lower temperature range is 30° to 60° C., preferably 40° to 50° C. The temperature of the combustion gas is generally about 350° to 450° C., and more often about 200° to 460° C. On the other hand, the temperature of unscrubbed waste gas exiting the coldest part of the regenerator is generally about −55° to −45° C., preferably about −50° to −48° C. Generally, the dew point of water in the flue gas is +42° C. By adding the heated air to the heated waste gas the dew point of water in said gases is relatively lowered to +38° C.

The absorption-type refrigeration unit is to be operated conventionally with an ammonia-water mixture, where the coolant ammonia is used for cooling both the regenerated absorption means and the purified waste gas flowing from the head of the scrubbing column, and is evaporated in the process. The coolant therefore is not only used for cooling the physical absorption agent, rather it is used—preferably in parallel connection—also to set the low temperature required at the cold end of the heat exchanger used to cool the unscrubbed combustion gas.

Yet still another development is that the heated air can also be diverted as a purge gas flow for regenerating adsorbers, preferably dessicating adsorbers, arranged in the system. More specifically, the dessicators would be arranged at the head of the regenerating column wherein the regenerable physical adsorbent is regenerated. The undesired gaseous components flow, (e.g. $SO_2$) would be removed at the head of the regenerating column and passed through the dessicators for removing moisture therefrom. Thus, formation of corrosive substances, e.g., sulfuric acid, hydrochloride acid is prevented. After a time, the dessicators would become loaded and the heated air could be passed therethrough for purging thereof.

If the lowest possible scrubbing temperature is desired, a heat pump circuit will be additionally provided to meet the cooling requirements of the absorption step, said circuit removing heat from the fluids participating in the scrubbing and transferring it to the coolant in the absorption-type refrigeration unit. The procedure in particular may be such that the refrigeration unit is operated with a mixture of water and ammonia and the heat-pump circuit with ammonia. The cold generated by the absorption-type refrigeration unit thus is brought down to a lower temperature level by using the heat-pump circuit operated on the same coolant. The ammonia of the heat-pump circuit liquified against ammonia evaporating in the absorption-type refrigeration unit will, after expansion, suitably be evaporated by heat exchange with the absorption agent to be cooled and to be fed to the scrubbing, and by means of purified waste gas removed from the top of the scrubbing column. When using ammonia in the heat-pump circuit, it should be evaporated at less than atmospheric pressure in order to obtain the lowest possible scrubbing temperatures, as otherwise it will be impossible to obtain a temperature less than −30° C.

It will be often appropriate that the heat exchange used for cooling the waste gas be allowed to take place in reversible regenerators. The procedure for instance may be such that special regenerators are provided for each of the upper and lower temperature ranges of the heat exchange. This method may be applied in particular when different gas flows are heated in the upper and the lower temperature ranges. It furthermore allows increased flexibility in the design of the regenerator means. Thus, a different number of regenerators may be used in the two temperature ranges, of which the design and the arrangement may be adapted in each case to the particular requirements. Normally it will be less important to achieve an optimal exchange efficiency in the upper temperature range of the heat exchange, because the main portion of the higher boiling components, especially the water, is removed by condensation only in the lower temperature range, and in consequence thereof and with the aim of obtaining complete resublimation, stress is to be laid on the maintenance of small temperature differences only in the lower temperature range. The requirements of uniformity of flow rate across the cross-section of a regenerator packing accordingly are less in the upper temperature range, which results in an enlargement of the regenerator cross-section and a drop in the number of regenerators.

A preferred regenerator design comprises two axially sequentially arranged packings separated by an imperforate partition in every regenerator associated with the upper temperature range. Such a regenerator then will be operated so that one of the packings is traversed by the waste gas to be cooled and the other simultaneously by the air to be heated, the packings being periodically reversed between waste gas and air. Both reversal phases are thus functionally combined in one single regenerator housing, whereby in the case of a drop in the amount of waste gases being obtained, one regenerator after the other may be shut off; ultimately, for a sufficiently small amount of waste gas, a single regenerator suffices while nevertheless fully meeting the required function. It is just as feasible to so adjust the entire plant beforehand that the operation in the upper temperature range will be by means of a single regenerator of the described design and operation.

As regards the lower temperature range, pairs of regenerators periodically reversing between the flows of gas to be cooled and heated and each time comprising two axially sequentially arranged packings traversed by said flows, each in an opposite direction either from the middle to the ends or vice versa, can be used. Thus, there are two packings parallel in the direction of flow in each regenerator housing. Hence the pressure loss with respect to the entire amount of gas flowing through a regenerator will be halved. As regards the direction of flow, it is preferred to proceed in such a manner that for each pair of regenerators, the one loaded with the waste gas precooled in the upper temperature range is crossed from the center to the ends, and the other which is loaded with the gas-flow to be heated is crossed from the ends to the center by the gas. Because the warm or hot parts of the regenerator. in this manner are at the center, outward thermal radiation can be advantageously minimized.

The described functional and constructional separation of the regenerators associated with the two temperature ranges of the heat exchange offers the additional advantage that the supply, to the power plant burning carbonaceous fuels, of heated combustion air may be disconnected from the waste gas purification achieved by the physical low temperature scrubbing step, if necessary. This may be the case for instance if there are malfunctions in the purification section that require its shutdown. The heat exchange taking place in the upper temperature range between the hot waste gases and the combustion air to be heated may then be carried out separately without any difficulty, whereby the operation of the power plant will not be affected by the disturbance in the purification section.

The above described process using regenerators may be applied in particular for removing sulfur dioxide from flue or power-plant gases containing sulfur trioxide and $H_2O$. It is suitable in such cases to separate the sulfuric acid formed from water and sulfur trioxide during precooling in the upper temperature range from the power plant gas prior to the entry of this precooled power plant gas into the lower temperature range. Generally there are obtained only small quantities of sulfuric acid which form condensed surface layers of the filling bodies of the regenerator packing. These condensed layers of sulfuric acid are then easily removed by the air to be heated. It is furthermore desirable to compress the flue gases to be cooled and purified only after having traversed the upper temperature range and before entering the lower temperature range, because compressing at lower temperatures affords less energy. Compression is an advantage per se, because it allows reducing the size of the regenerators.

The use of regenerators for removing sulfur dioxide from other gases, is already known, as such, from the German Pat. No. 965,919. However, the regenerators there are of somewhat different design than herein. As already mentioned, flue gases as a rule contain corrosive components, e.g., sulfur trioxide which combines with steam during cooling to form sulfuric acid. As corrosion-resistant regenerator packings and linings may be used, the use of high-alloy steels for the exchangers or the addition of corrosion inhibitors is not necessary.

As regards the scrubbing step to remove sulfur dioxide, it is preferred to use dimethylformamide as the physical, regenerable liquid absorbent. Dimethylformamide is preferred over methanol because, having a substantially lower vapor pressure than methanol, it is possible to substantially reduce the losses of absorbent vapors escaping from the head of the scrubbing column, and the evaporation losses which occur during the hot regeneration step. (It is to be appreciated, however, that any conventional physical regenerable scrubbing agent which is liquid at below 0° C. may be utilized. By "physical" is meant a scrubbing agent which does not rely on a chemical reaction for the removal of the undesired components from the gas.)

Flue gases generated by the combustion of carbonaceous fuels with air, in addition to nitrogen and water vapor, in general contain substantial amounts of carbon dioxide which in view of the operating conditions used herein, reach the scrubbing column almost in toto. Because of the special selectivity of dimethylformamide for sulfur dioxide, only a slight proportion of the carbon dioxide will be absorbed in the dimethylformamide. It will be appropriate, therefore, that the regeneration of the absorbent take place in two stages, the carbon dioxide that was dissolved along with the sulfur dioxide being removed in the first stage and the sulfur dioxide in the second stage. It is preferred that the carbon dioxide be removed with a stripping gas, and the sulfur dioxide be removed thermally at subatmospheric pressure. Nitrogen may be used as the stripping gas. Viewed overall, the use of dimethylformamide as the absorbent in lieu of methanol is advantageous not only on account of the lower evaporation losses but also because of a lower demand on the regeneration step by co-dissolved carbon dioxide.

Inasmuch as sulfur trioxide and water vapor cannot be completely removed in the regenerators, there is the danger in the subsequent process steps that sulfuric acid will be formed. An additional source of sulfuric acid formation is the presence of residual concentrations of nitrogen dioxide in the flue gas, which, through the oxidation of sulfur dioxide, also results in the formation of sulfur trioxide. Appropriately therefore, the sulfuric acid formed from residual sulfur trioxide or from sulfur trioxide generated by the oxidation of sulfur dioxide and residual moisture should be removed from the regenerated absorbent to prevent a buildup of corrosion causing amounts. It is less desirable to remove the sulfuric acid from the loaded absorbent, because sulfur trioxide can be formed again from sulfur dioxide by oxidation as long as the sulfur dioxide remains in the scrubbing fluid and the elimination of $SO_2$ from the scrubbing agent takes place only in the second regeneration stage.

As one way of removing sulfuric acid, a neutralization step can be provided using all the conventional neutralizers, preferably ammonia or calcium oxide. The ammonium sulfate produced when neutralizing with ammonia can be filtered off. Calcium oxide preferably is used in granulated form and in excess. Other neutralizers, for example, are potassium and soda lyes, which can be applied in aqueous, or also in methanolic or ethanolic solutions.

It is also possible, however, to remove the dimethylformamide by distillation from the sulfuric acid which is then concentrated in the sump of the distillation column while the dimethylformamide is removed in gaseous form from the head of the column. Any residual dimethylformamide can be removed from the distilled concentrated sulfuric acid by extraction with a solvent immiscible with sulfuric acid. Appropriately, extraction will be performed with a polar organic solvent, for instance chloroform, toluol or benzene. If the sulfuric acid concentration is insufficient to form two phases, the extraction may be carried out in the presence of water. In such a case, the sulfuric acid will collect in the aqueous phase while the dimethylformamide to a large extent is absorbed in the organic phase.

Ion exchange may also be considered as another alternative for the removal of the sulfuric acid. A basic OH ion exchanger may be used, which absorbs the sulfate ion and which subsequently can be regenerated with a solution of potassium lye in dimethylformamide or in water.

Furthermore the sulfuric acid can also be adsorptively removed from the regenerated absorbent. Adsorbents which can be used for instance are activated carbon or aluminum oxide.

In addition, to prevent additional formation of sulfuric acid, the sulfur dioxide removed from the absorbent according to the invention and where appropriate, following the separation of other gaseous components simultaneously removed, can be passed through dessicators prior to removal from the system. The dessicators are used for removing moisture from the undesired gaseous components (e.g. $SO_2$) stream to thereby prevent formation of corrosive substances, e.g., sulfuric acid, hydrochloride acid. For the purpose of regenerating the dessicators, the heated air can also be used at least in part as the purging gas for the dessicators.

The dried sulfur dioxide is then removed from the dessicators and can be liquified in a conventional manner and then be supplied as a concentrated product for further use. Moreover, where desired, the removed $SO_2$ can be later oxidized with oxygen after removal, for instance from the air, to sulfur trioxide, and be dissolved in water or diluted sulfuric acid, whereby sulfuric acid of a mean concentration is obtained.

DETAILED DESCRIPTION OF THE DRAWINGS

Figure 1:
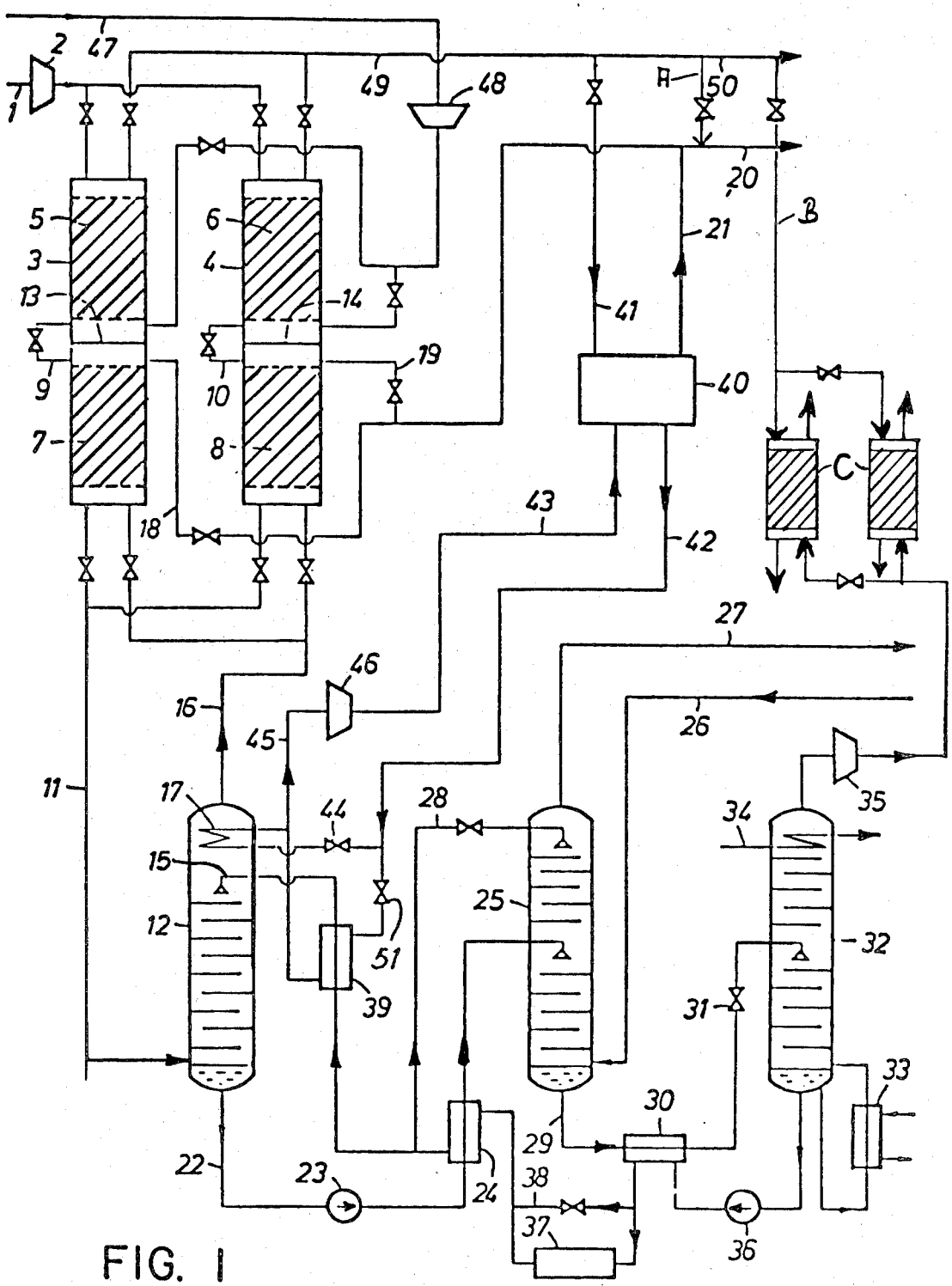
FIG. 1 is a schematic flowsheet of a preferred embodiment of the overall process of the invention.

A flue gas containing about 75% by volume nitrogen and argon, about 14% by volume carbon dioxide, about 7% by volume $H_2O$ and about 4% by volume oxygen and 0.06% by volume sulfur dioxide and 0.003% by volume sulfur trioxide is treated to deplete the gas of the two sulfur oxides. 15,000 $m^3/h$ (stp) of this flue gas are passed via line 1 to a compressor 2, where it is compressed to a pressure of 1.3 bar and then fed at a temperature of 310° C. to one of the two regenerators 3,4.

Each of these regenerators 3 and 4 comprises two packings 5 and 7, and 6 and 8 mounted above each other. The packings may consist of stones, fillers of ceramic or other conventional materials which above all must be resistant to corrosion from sulfuric acid. Both packings are always separated from each other by closed partitions 13 and 14. Valved conduits 9 and 10 provide communication when desired between the two packing spaces.

The flue gas passes through one of the two regenerators, is cooled to 48° C. in the first packing 5 or 6 and is passed through an associated conduit 9 or 10 into the second packing 7 or 8, where it is further cooled to −50° C. and finally is drawn off through a conduit 11 from the particular regenerator. The composition of the flue gas in the case of the above illustrative example changed only to the extent that the resultant entrained water vapor content was reduced to only 480 g/h. Accordingly, the originally present water vapor is almost completely precipitated in the regenerator packings.

Therefore, nearly completely dried flue gas, 13,952 $m^3/h$ (stp), is passed through conduit 11 and arrives at the lower part of a scrubbing column 12 operated at a pressure of 1.2 bar. Regenerated liquid dimethylformamide at a temperature of about −50° C. is supplied as absorbent through a line 15 to the upper part of this scrubbing column. Almost all of the sulfur dioxide contained in the flue gas together with small amounts of carbon dioxide are absorbed in the absorbent. The flue gas so purified and cooled in the head condenser 17 to a temperature of −53° C. leaves the scrubbing column through a conduit 16. Henceforth the flue gas contains at most 1 $m^3/h$ (stp) of sulfur dioxide, i.e., not more than 70 ppm by volume. The sulfur trioxide content is below the detection limits, and the carbon dioxide content is decreased by 18.4 $m^3/h$ (stp).

The purified cold flue gas flows through conduit 16 to the second, i.e., the lower packing of the other of the two regenerators 3 and 4 removes the water deposited there and leaves the regenerator by conduit 18 or 19. After supplying 3,061 $m^3/h$ (stp) of air at a temperature of 180° C. through conduit 21, a gas mixture at about 67° C. is drawn off through conduit 20, said mixture mainly consisting of nitrogen, carbon dioxide, oxygen and water vapor and presently containing only about 60 ppm by volume of sulfur dioxide. This gas mixture is discharged into the atmosphere through the exhaust stack or chimney.

In the meantime, the liquid absorbent loaded with sulfur dioxide and carbon dioxide is removed from the bottom of the scrubbing column 12. This loaded absorbent, 2.5 tons/hour, is passed through a conduit 22 and a liquid pump 23 and arrives at a heat exchanger 24 where it is heated to about 20° C. and then is fed into a stripping column 25. This column is operated at a pressure of 1.1 bars and is used to strip out the carbon dioxide, using nitrogen supplied through a conduit 26 as the stripping gas. This gaseous nitrogen is fed at a rate of 200 $m^3/h$ (stp). It leaves the stripping column at the head through conduit 27 and entrains 17 $m^3/h$ (stp) of carbon dioxide. Regenerated absorbent, 0.6 tons/h, is preferably fed through a conduit 28 to the head of the stripping column 25 to absorb any sulfur dioxide converted into the vapor phase. The absorbent henceforth depleted in carbon dioxide down to a residual content of 1.4 m³/h (stp) is removed through a conduit 29 from the sump of the stripping column 25, and heated to about 65° C. in a heat exchanger 30 in indirect heat exchange contact with hot, regenerated absorbing means, expanded in a throttle valve 31 and introduced into a regenerating column 32.

Regenerating column 32 comprises a sump heater 33 and a head condenser 34 and operates at a sub-atmospheric pressure of 0.1 bars. The expelled sulfur dioxide—a total of 8 m³/h (stp)—together with the residual carbon dioxide, also expelled, a total of 1.4 m³/h (stp), is removed through the head of the regenerating column 32 and is passed to dessicating adsorbers, i.e., dessicators C wherein substantially all the moisture remaining is removed. The dried sulfur dioxide prior to being passed through dessicators C is compressed in compressor 35 for ultimately being removed from the system. The dessicators are continually being purged by a hot air flow introduced through conduit B so that removal of the moisture from the sulfur dioxide or other contaminants can be continued. More specifically, purging occurs when the dessicators C are almost fully loaded whereby conventional means are used to divert at least a part of the hot air flow to the dessicators C when a predetermined loaded condition of the dessicators C is sensed or reached.

The sump heater 33 can be heated with condensed steam, and the head condenser 34 operated with cooling water. The temperature in the sump of the regenerating column is 70° C., that of the drawn off gas mixture is 25° C.

Regenerating at a sub-atmospheric pressure of 0.1 bars offers the advantage that the hydrolysis of the dimethylformamide is nearly wholly suppressed. The risk of hydrolysis must be considered because slight amounts of water acidified by sulfuric acid may be entrained into the regenerating column, the hydrolysis of dimethylformamide being particularly pronounced in aqueous acidic solutions. This hydrolysis, however, is strongly temperature dependent in that it decreases with decreasing temperatures. Because, on the other hand, the regeneration is meant to be conducted not excessively below the boiling point of the absorbent, which for normal pressure is however 153° C. for dimethylformamide, a corresponding decrease in the regeneration pressure and hence of the boiling point allows meeting both the requirement of being near the boiling temperature and the need for nearly complete suppression of hydrolysis.

3.1 tons/h of hot, completely regenerated absorbent are drawn off the sump of regenerating column 32, and are raised to a pressure of about 1.3 bars by means of a liquid pump 36, then cooled in the heat exchanger to about 25° C., and where desired, fed to a system 37 for removing any sulfuric acid that was formed. The said system may also be obviated by a parallel conduit 38. Following further cooling to about −32° C. in the heat exchanger 24 and tapping of 0.6 tons/h for the absorbent required by stripping column 25 through the conduit 28, the remaining 2.5 tons/h of the regenerated absorbent following renewed cooling in a heat exchanger 39 finally is introduced at a temperature of about −50° C. into the upper part of the scrubbing column 12.

The last cooling required for the regenerated absorbent in the heat exchanger 39 and for the flue gas removed from the head of the scrubbing column 12 in purified form is made possible by an absorption-type refrigeration unit 40. This unit is conventionally operated with a mixture of ammonia and water, the ammonia acting as the coolant. Preferably, a single-stage unit will be used. The reference numeral 40 therefore covers the two circuits for the solvent, i.e., water, and the coolant, i.e., ammonia, said circuits being crossed in common from the absorber of the evaporated ammonia to the rectifier, including the ammonia condenser and the ammonia evaporator, in which the ammonia of the heat pump circuit, introduced through conduit 43 and removed through conduit 42, is condensed, and the ammonia rectifier is heated by the hot air flow introduced through conduit 41 and removed through conduit 21.

Accordingly, condensed ammonia, corresponding to 140 m³/h (stp) of the gaseous type, is introduced through conduit 42 and divided into the two partial flows, expanded in throttle valves 51 and 44 to a subatmospheric pressure of 0.35 bars and then is evaporated in heat exchangers 39 against regenerated absorption means to be cooled and in the top condenser 17 against purified flue gas to be cooled, recombined in a conduit 45, again compressed to a pressure of about 1 bar in a compressor 46 and returned through conduit 43 to the evaporator of the absorption-type refrigeration unit 40. The heating of the rectifier means of the unit 40 is carried out by hot air. This hot air is introduced at a rate of 3,061 m³/h (stp) at a temperature of 300° C. through line 41 and is removed after cooling to 190° C. through conduit 21. The heat fed to the rectifier means therefore is about 704,000 kcal/h and that supplied to the scrubbing is about 35,000 kcal/h.

The amount of air used for the heat supply to the absorption-type refrigeration unit 40 is introduced together with the air of combustion required for the combustion process through a conduit 47. A total of 17,300 m³/h (stp) are compressed in a compressor 48 to 1.1 bars and are passed through the first, i.e., upper packing 5 and 6—previously heated with hot flue gas—of the other of the two regenerators 3 and 4, and removed at a temperature of 300° C. through conduit 49. 14,239 m³/h (stp) of hot air are fed through conduit 50 as air of combustion to the combustion process, whereas 3061 m³/h (stp) are fed through conduit 41 to the absorption-type refrigeration unit 40, and after cooling to about 190° C., are admixed to the purified flue gas flowing out through conduit 20.

Additionally, the hot air can be added directly to the purified flue gas, i.e., the scrubbed combustion gas, through conduit A. Clearly, the mass flows will vary as needed and according to the number of uses of the hot air flow. By so mixing the purified flue gas and hot air, the temperature of the flue gas is increased and thus the draft in the exhaust stack or chimney is decreased. Furthermore, the dew-point of water in the flue-gas is lowered and the danger of falling below the dew-point is reduced. By adding the heated air the temperature of the flue gas before entering into the chimney is increased by about 20° to 40° C., i.e. to 90° to 110° C. Thus, the danger of falling below the dew point of water in the flue gas during cooling in the chimney is lowered. Furthermore, by adding the heated air the dew point of water is additionally lowered, e.g. from +42° C. to +38° C.

Besides water and $CO_2$ there are other residual impurities in the gas, e.g. $SO_3$, $SO_2$, HCL, HF, that means acid formers. When the purified flue gases in the chimney is cooled below the dew point of water there is the possibility of a corrosive attack to the brickwork. More specifically, the possibility of water, e.g., present because of falling below the dew-point, combining with any remaining $SO_2$ to form sulfuric acid or other corrosive substances is substantially reduced.

Finally, as previously discussed, the hot air can also be used as a purging gas for dessicators C. This flow is diverted through conduit B into the dessicators for purging the dessicators after drying of an $SO_2$ flow therethrough. Thus, there are 4 alternative and/or inclusive uses for the hot air which help to make the system much more energy efficient.

Figure 2:
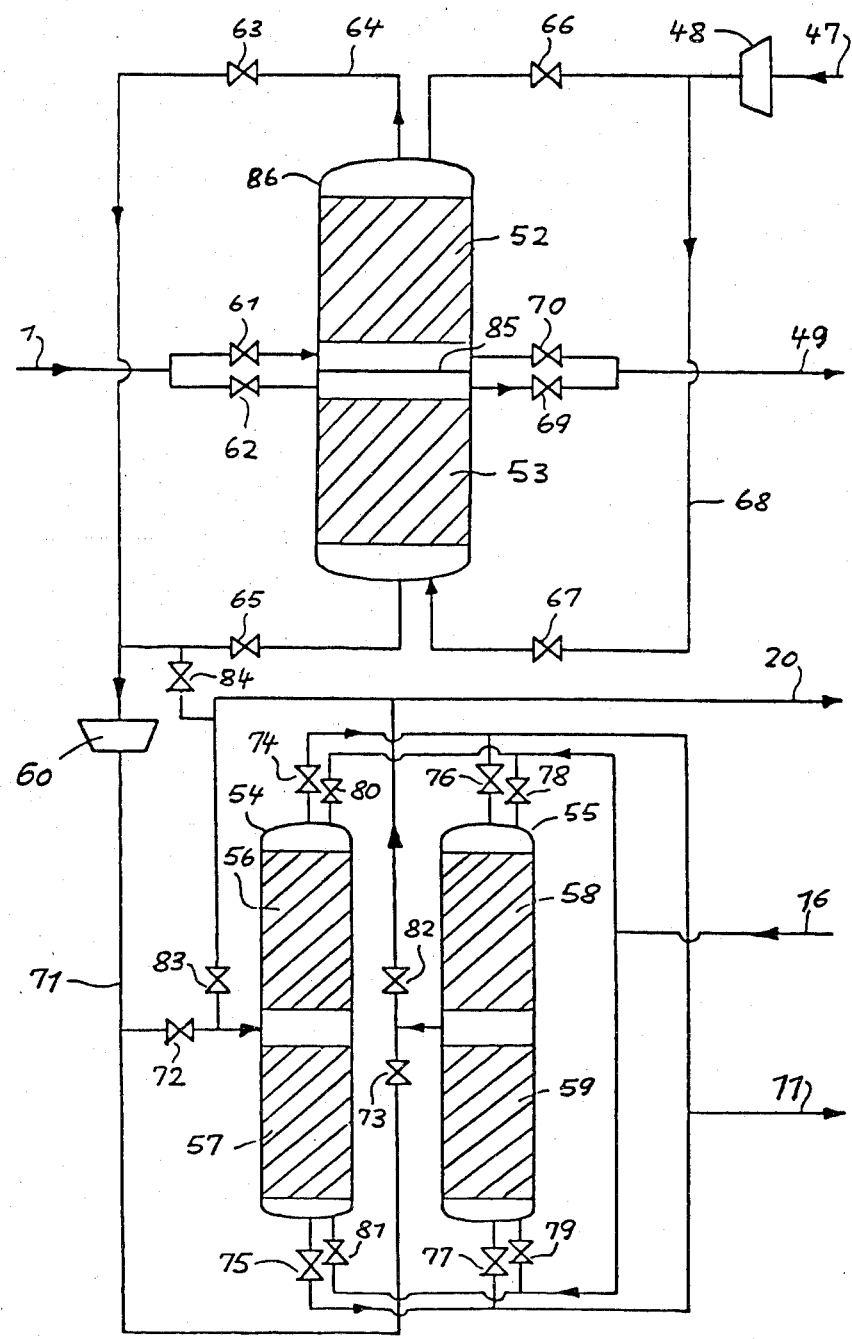
FIG. 2 is a schematic representation of a preferred embodiment of the regenerator means.

The schematic process of FIG. 2 comprises a special embodiment of the regenerator means of a plant for implementing the process of the invention. Essentially three regenerators 86, 54, 55 are shown, regenerator 86 being associated with the upper temperature range, regenerators 54 and 55 to the lower one of the heat exchange. Every regenerator shown is provided with two packings 52 and 53, 56 and 57, and 58 and 59, respectively, which, in the case of regenerator 86 are separated by a fixed imperforate partition 85, whereas as regards regenerators 54 and 55, no such partition exists. In addition to precooling the hot flue gas to be purified and introduced through conduit 1, the packings of regenerator 86 also are used to separate the sulfuric acid formed from water vapor and sulfur trioxide by condensation and resublimation into the air to be heated.

The hot flue gas introduced through conduit 1 passes through an open valve 61 into the half-space of regenerator 86 which contains the packing 52. The flue gas is precooled there and leaves the regenerator through a conduit 64 and arrives by means of an open valve 63 at the compressor 60, which for instance may be a blower. The valves 62, 70, 66, 65 and 84 shown in the figure are closed. On the other hand, the packing 53 located in the other half-space of the regenerator 86 and previously heated by hot flue gas is used to heat air compressed in a compressor 48 and introduced through a conduit 47. This compressed air first passes through a conduit 68 and an open valve 67 into the corresponding half space, and after flowing through the packing 53 is removed in the heated state through an open valve 69 and a conduit 48. As already mentioned, in relation to FIG. 1, this air is partly used as air of combustion and partly as a heating medium for the absorption-type refrigeration unit.

The precooled, pre-purified flue gas following compression in compressor 60 passes through a conduit 71 and an open valve 72 into the inside space of regenerator 54, namely between the two packings arranged therein. These packings are traversed by the flue gas in opposite directions toward the ends of the regenerator, the gas thereby being further cooled and higher boiling components, especially water vapor, being deposited, and the packings being heated correspondingly. The flue gas thus finally cooled passes through open valves 74 and 75 into a conduit 11 leading to the ensuing low temperature scrubbing for sulfur dioxide removal. Cold purified flue gas is introduced through a conduit 16 from the low temperature scrubbing system and is passed through open valves 78 and 79 into regenerator 55 to flow therethrough from the regenerator ends toward the middle, thereby delivering refrigeration to the two previously heated packings 58 and 59. The flue gas so reheated taking along resublimated water vapor, leaves the regenerator 55 at the center and passes through an open valve 82 into a conduit 20 leading to the stack through which the purified flue gas is blown out. For the operational period shown, valves 83, 80, 81, 77, 76 and 73 are closed.

The packings of regenerator 86 are periodically reversed between the hot flue gas and the air to be heated. This is implemented by valves 61, 62, 63 and 65, and 66, 67, 69 and 70. The flow direction is alternated from period to period. Both packings however are always traversed by the gases in the same direction.

The two regenerators 54 and 55 of that pair of regenerators belonging to the lower temperature range of the heat exchange also are reversed periodically, but not necessarily at the same rate as those of regenerator 86. In contrast to the latter, the reversal in the lower temperature range does not take place between the packings of the same regenerator, rather between the regenerators proper, so that the two packings of a pair of packings 56, 57 or 58, 59 are always traversed by the same medium and belong to the same operational period. When reversing in the lower temperature range, the previously closed valves 73, 76, 77 and 80, 81 and 83 are opened in lieu of the previously open valves 72, 74, 75 and 78, 79 and 82 now to be closed.

The flue gas for instance at a temperature of 150° C. is introduced through a conduit 1, is precooled in the particular packing of regenerator 86 to about 50° C. and compressed with heating to 90° C. in compressor 60 from atmospheric pressure approximately to 1.65 bars approximately. The air to be heated in compressor 48 for instance is compressed to 1.1 bars and then heated in the corresponding packing of regenerator 86 to 140° C. The purified flue gas evacuated through conduit 20 and to be blown out through the stack in this case has a temperature of about 85° C.

In case of malfunctions in the low temperature scrubbing, the upper temperature range of the heat exchange can be decoupled from the lower one. To that end, with closed valves 82 and 83, valve 84 will be opened, whereby the precooled flue gas can be discharged, without any further cooling, directly into the atmosphere or for instance into an emergency purification plant which meets less stringent requirements than those placed on the low temperature scrubbing system. By closing a non-illustrated valve at the intake of the compressor 60, the latter may also be shut off from the flow of the medium.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for removing undesired gaseous components from hot combustion gases by scrubbing with a regenerable absorbent,
   the improvement comprising:
   conducting the scrubbing with a liquid physical absorbent at a temperature less than 0° C. and supplying required cooling of the scrubbing process by means of an absorption-type refrigeration unit, cooling the combustion gases prior to scrubbing, in indirect heat exchange with gas streams to be heated, the indirect heat exchange being performed in an upper temperature range and a subsequent lower temperature range, and using air as said gas stream to be heated in the upper temperature range of the indirect heat exchange, resultant heated air being used in part as (a) preheated air of combustion or in part as (b) an energy source for the operation of the absorption-type refrigeration unit.

2. In a process for removing undesired gaseous components from hot combustion gases by scrubbing with a regenerable absorbent, the undesired gaseous components being passed through dessicators prior to removal from the system, and the scrubbed combustion gases being removed through an exhaust stack, the improvement comprising:

conducting the scrubbing with a liquid physical absorbent at a temperature less than 0° C. and supplying the required cooling of the scrubbing process by means of an absorption-type refrigeration unit, cooling the combustion gases prior to scrubbing, in indirect heat exchange with gas streams to be heated, the indirect heat exchange being performed in an upper temperature range and a lower temperature range, and using air as said gas stream to be heated in the upper temperature range of the indirect heat exchange, resultant heated air being used in part as (a) preheated air of combustion, in part as (b) an energy source for the operation of the absorption-type refrigeration unit, in part as (c) an admixture to the purified combustion gases for increasing the temperature of the purified combustion gas and thus, the draft in the exhaust stack of the system, and for lowering the dew point of water in the flue gas, or in part as (d) a purging gas for regenerating the dessicators arranged for having the stream of products removed from the regenerated absorbent pass therethrough before removal from the system.

3. A process according to claim 1 or 2, wherein cold combustion gas purified by the scrubbing is used in the lower temperature range as said stream to be heated.

4. A process according to claim 3, wherein the temperature boundary between the upper and lower temperature range zones is above the temperature of the air used for cooling the hot combustion gases.

5. A process according to claim 3, wherein the heated air following its use as an energy source for the operation of the absorption cooling system, is mixed with the resultant purified, heated waste gas.

6. A process according to claim 1 or 2, wherein the absorption cooling system is operated with an ammonia-water mixture and the ammonia acting as the coolant cools both the regenerated absorbent, and the purified waste gas flowing from the head of the scrubbing column, and said ammonia coolant is evaporated thereby.

7. A process according to claims 1 or 2, further comprising a heat pump system, said system removing heat from at least the physical absorbent and transferring said heat to the coolant of the absorption system.

8. A process according to claim 7, wherein the absorption cooling system is operated by a water-ammonia mixture and the heat pump system by ammonia.

9. A process according to claim 8, wherein the ammonia of the heat pump system condensed by the evaporating ammonia of the absorption cooling equipment following expansion is evaporated in heat exchange against both (a) the absorbent to be cooled and to be fed into a scrubbing column, and (b) purified waste gas to be removed from the top of the scrubbing column.

10. A process according to claim 9, wherein the ammonia of the heat pump system is evaporated at sub-atmospheric pressure.

11. A process according to claim 3, wherein the heat exchange for cooling the combustion gas takes place in reversible regenerators.

12. A process according to claim 11, wherein separate regenerators are provided for each of the upper and the adjoining lower temperature range zones of the heat exchange.

13. A process according to claim 12, wherein each of the regenerators associated with the upper temperature range zone comprises two axially sequential packings separated by a partition, one of said packings always being traversed by the combustion gas to be cooled, and the other simultaneously by the air to be heated, and the packings being periodically reversed between combustion gas and air.

14. A process according to claim 12, wherein pairs of regenerators comprising axially sequential packings and periodically reversed between the flows of gases to be cooled and to be heated are used for the lower temperature range, the gases passing through the two packings of each particular regenerator always in opposite directions, either from the middle to the ends or vice-versa.

15. A process according to claim 14, wherein the regenerator of each pair fed with combustion gas precooled in the upper temperature range, is traversed from the middle to the ends and the other regenerator, fed with the cold purified combustion gas to be heated, is traversed from the ends to the middle by said media.

16. A process according to claim 3, for removing sulfur dioxide from combustion gases containing $SO_2$, $SO_3$ and $H_2O$ and further comprising separating sulfuric acid formed during precooling in the upper temperature range zone for the precooled combustion gas before the latter enters the lower temperature range zone.

17. A process according to claim 16, wherein the combustion gases precooled in the upper temperature range zone of the heat exchange are compressed before entering the lower temperature range.

18. A process according to claims 1 or 2, wherein dimethylformamide is the absorbent.

19. A process according to claim 18, comprising regenerating the absorbent in two separate stages, codissolved carbon dioxide being expelled in the first stage and sulfur dioxide in the second.

20. A process according to claim 19, characterized in that the carbon dioxide is expelled by means of a stripping gas and the sulfur dioxide at sub-atmospheric pressure and with heat applied.

21. A process according to claim 18, further comprising removing any sulfur acid formed from residual $H_2O$ and residual sulfur trioxide or $SO_3$ from oxidized sulfur dioxide from the regenerated absorbent.

22. A process according to claim 21, wherein the sulfuric acid is removed by neutralization.

23. A process according to claim 22, wherein neutralization is carried out with ammonia.

24. A process according to claim 22, wherein the neutralization is conducted with calcium oxide.

25. A process according to claim 21, wherein dimethylformamide is separated from sulfuric acid by distillation.

26. A process according to claim 25, wherein residual dimethylformamide is removed from sulfuric acid concentrated by distillation by extracting the dimethylformamide with a solvent immiscible with sulfuric acid.

27. A process according to claim 26, wherein the solvent is a polar, organic solvent.

28. A process according to claim 27, wherein the extraction is carried out in the presence of water.

29. A process according to claim 27, wherein the solvent is chloroform, toluene, or benzene.

30. A process according to claim 1, further comprising removing any remaining moisture in undesired gaseous components removed from the regenerated absorbent by passing the undesired gaseous components through dessicators before removal from the process.

31. A process as in claim 2, wherein said resultant heated air is used only in part as (a) preheated air of combustion.

32. A process as in claim 2, wherein said resultant heated air is used only in part as (b) an energy source for the operation of the absorption-type refrigeration unit.

33. A process as in claim 2, wherein said resultant heated air is used only in part as (c) an admixture to the purified combustion gases for increasing the temperature of the purified combustion gas and thus, the draft in the exhaust stack of the system, and for lowering the dew point of water in the flue gas.

34. A process as in claim 2, wherein said resultant heated air is used only in part as (d) a purging gas for regenerating the dessicators arranged for having the stream of products removed from the regenerated absorbent pass therethrough before removal from the system.

35. A process as in claim 2, wherein said resultant heated air is used in part as (a) preheated air of combustion, in part as (b) an energy source for the operation of the absorption-type refrigeration unit, in part as (c) an admixture to the purified combustion gases for increasing the temperature of the purified combustion gas and thus, the draft in the exhaust stack of the system, and for lowering the dew point of water in the flue gas, and in part as (d) a purging gas for regenerating the dessicators arranged for having the stream of products removed from the regenerated absorbent pass therethrough before removal from the system.

* * * * *